United States Patent [19]
Hather

[11] 4,284,303
[45] Aug. 18, 1981

[54] PICKUP TRUCK COVER AND HINGE CONSTRUCTION

[75] Inventor: Robert K. Hather, Morro Bay, Calif.

[73] Assignee: Mark Woolpert, San Luis Obispo, Calif.

[21] Appl. No.: 63,112

[22] Filed: Aug. 1, 1979

[51] Int. Cl.³ .............................................. B60P 7/02
[52] U.S. Cl. ..................................... 296/100; 16/171
[58] Field of Search ............. 296/100, 137 B; 49/193; 16/171–178

[56] References Cited

U.S. PATENT DOCUMENTS

| | | | |
|---|---|---|---|
| 2,909,387 | 10/1959 | Burtzloff | 296/10 |
| 3,069,199 | 12/1962 | Reardon | 296/100 |
| 3,420,570 | 1/1969 | Kunz | 296/100 |

*Primary Examiner*—Robert R. Song
*Attorney, Agent, or Firm*—Harvey B. Jacobson

[57] ABSTRACT

A pair of elongated cover sections disposed in side-by-side relation and having remote marginal edges thereof spaced apart for overlying the upper marginal portions of the side walls of a pickup truck load bed. The cover sections include adjacent marginal edges for bridging between the front end wall and the tailgate of the load bed and extend along the longitudinal center thereof and corresponding end marginal edges for overlying the upper marginal portions of the front end wall and tailgate of the load bed. Separable barrel hinge structures are spaced along the remote and adjacent marginal edges of the cover sections for releasably pivotally securing the cover section remote marginal edges to the load bed side walls and the adjacent marginal edges of the cover sections to each other, the hinge structures including axially shiftable hinge pins as opposed to rotatable hinge pins and slotted hinge barrels with which longitudinally spaced narrowed portions of the hinge pins may be registered to allow lateral separation of the slotted hinge barrels from the pins. The hinge structures spaced along each longitudinal marginal portion of the cover sections are connected together for simultaneous longitudinal shifting.

10 Claims, 13 Drawing Figures

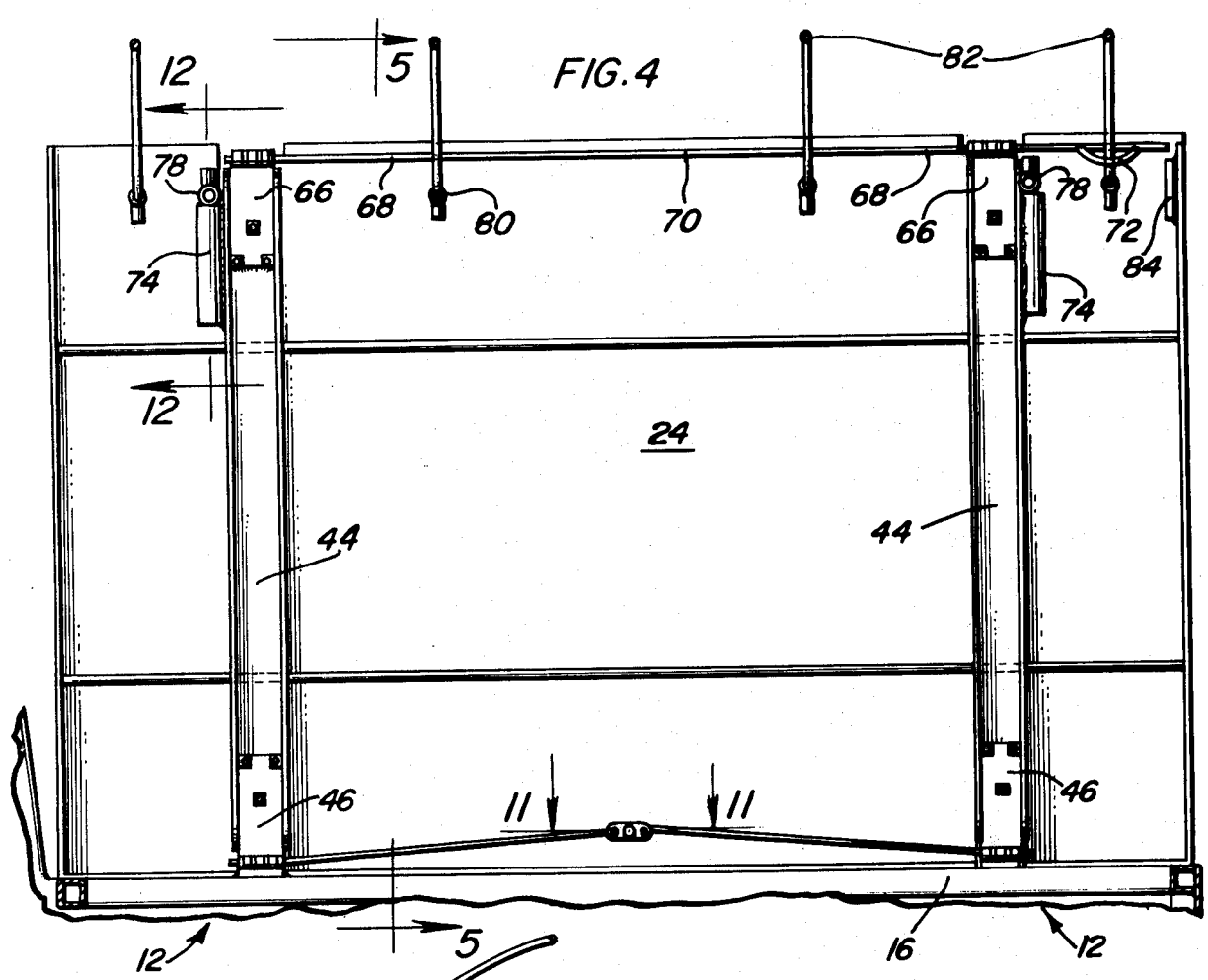

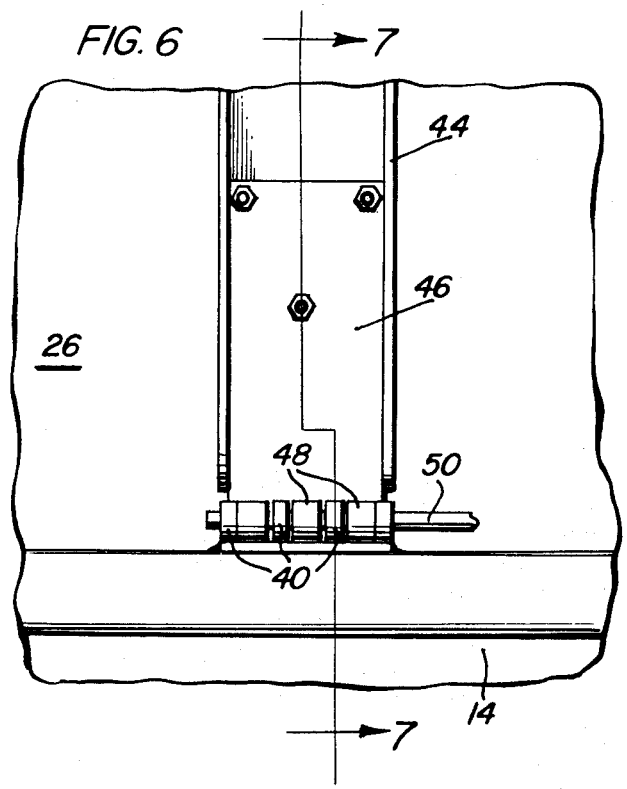
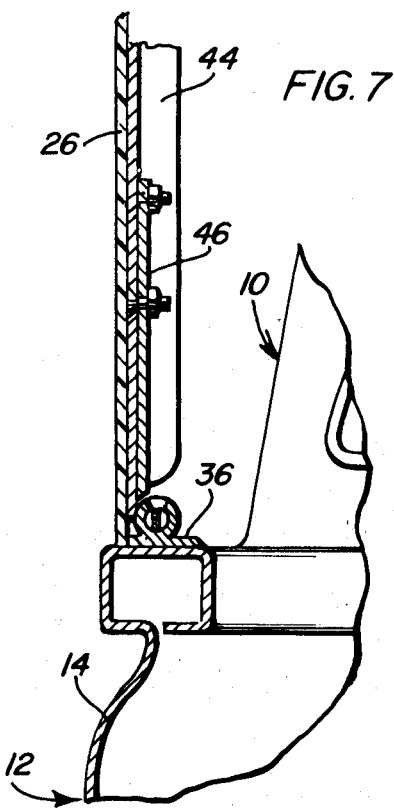
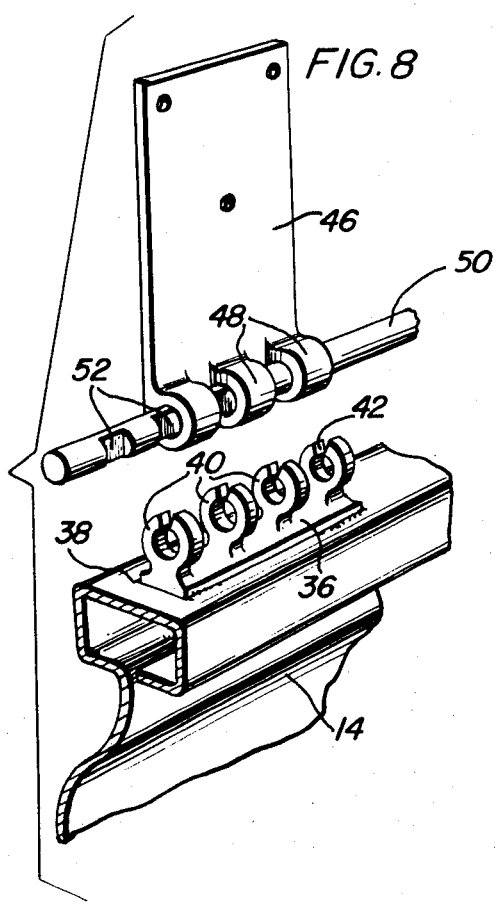
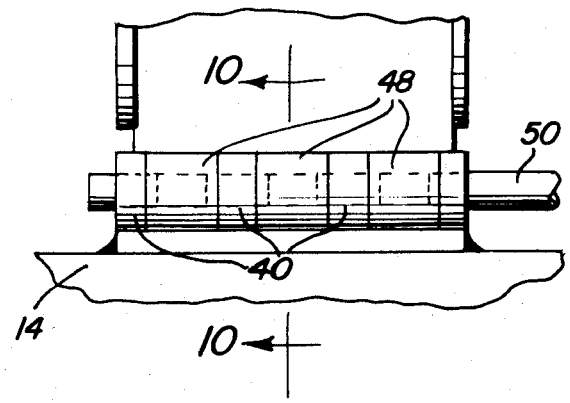
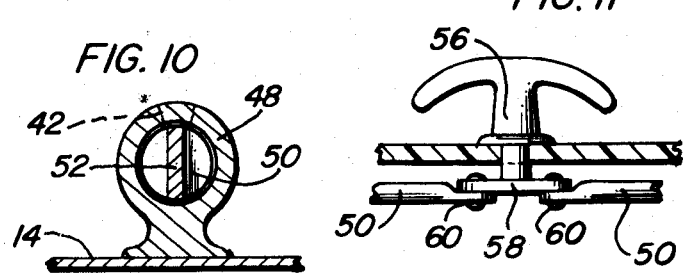
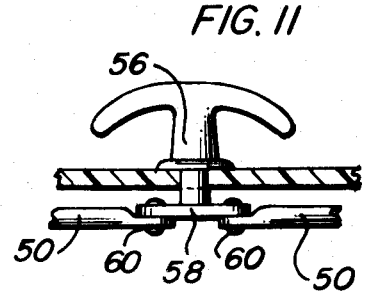

PICKUP TRUCK COVER AND HINGE CONSTRUCTION

BACKGROUND OF THE INVENTION

Various forms of enclosures or covers have been heretofore designed for use in conjunction with the load beds of pickup trucks. Some of these enclosures include opposite side cover sections whose remote marginal edges are hingedly supported from the adjacent load bed side walls whereby the cover sections may be opened and closed from their adjacent marginal edges, while other covers include single cover sections hingedly supported along one longitudinal edge portion from a corresponding load bed side wall and swingable from the other side wall between an opened and closed position.

However, inasmuch as the load bed of a pickup truck is reasonably large in plan area and access to the interior thereof is most convenient either from the rear end of the load bed or from the opposite side walls of the load bed, a need exists for a cover for a load bed which may be opened from either side of the load bed or from the rear end thereof.

Although various forms of load bed covers such as those disclosed in U.S. Pat. Nos. 1,038,591, 1,136,643, 2,909,387, 3,420,570, and 3,514,152 as well as the hinge structures disclosed in U.S. Pat. Nos. 1,621,047, 2,333,732, 2,346,977, and 3,805,325 disclose some of the structural features of the instant invention, the over-all combination of features incorporated in the instant invention are not shown by these prior patents.

BRIEF DESCRIPTION OF THE INVENTION

The pickup truck cover and hinge construction of the instant invention provides cover for the load bed of a pickup truck and yet allows access to the interior of the load bed beneath the cover from either side of the load bed or from the rear end thereof. In addition, the instant invention provides structure whereby the effective vertical extent of the side walls of the associated pickup truck may be increased and a flexible tarpaulin, or the like, may be secured over the vertically extended side walls. Further, the instant invention is constructed in a manner whereby it may be manufactured in the few different basic sizes of pickup truck load beds and wherein each manufactured size of cover may be readily utilized in conjunction with pickup trucks of different makes having the same general size load bed.

The main object of this invention is to provide a novel cover for a pickup truck load bed.

Another object of this invention is to provide a cover for a pickup truck load bed and which will enable access to the interior of the load bed beneath the cover from either side of the load bed or the rear end thereof.

Still another important object of this invention is to provide a pickup truck load bed cover construction including features thereof effective to vertically extend the side wall height of the associated load bed.

A still further object of this invention, in accordance with the immdiately preceding object, is to provide a structure whereby a tarpaulin or similar cover may be secured over the extended pickup truck side walls.

Yet another important object of this invention is to provide a pickup truck load bed cover which may be readily constructed of the several different basic sizes of pickup truck load beds and with the cover of each basic size being capable of operation in conjunction with various manufactures of pickup trucks having that basic size load bed.

A final object of this invention to be specifically enumerated herein is to provide a pickup truck cover in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged, fragmentary, longitudinal, vertical sectional view taken substantially upon the plane indicated by the section line 4—4 of FIG. 3;

FIG. 5 is a transverse vertical sectional view taken substantially upon the plane indicated by the section line 5—5 of FIG. 4;

FIG. 6 is a fragmentary enlarged side elevational view of one of the hinge constructions of the cover;

FIG. 7 is a fragmentary transverse vertical sectional view taken substantially upon the plane indicated by the section line 7—7 of FIG. 6;

FIG. 8 is a fragmentary exploded perspective view of the hinge components illustrated in FIG. 7;

FIG. 9 is a fragmentary enlarged elevational view of the hinge components illustrated in FIG. 7;

FIG. 10 is an enlarged fragmentary vertical sectional view taken substantially upon the plane indicated by the section line 10—10 of FIG. 9;

FIG. 11 is an enlarged fragmentary horizontal sectional view taken substantially upon the plane indicated by the section line 11—11 of FIG. 4;

FIG. 12 is an enlarged fragmentary transverse vertical sectional view taken substantially upon the plane indicated by the section line 12—12 of FIG. 4; and FIG. 13 is a fragmentary enlarged transverse vertical sectional view illustrating the manner in which a lock pin may be utilized to secure the rear end portions of the adjacent marginal edges of the cover sections against relative vertical shifting when the tailgate of the associated pickup is open.

DETAILED DESCRIPTION OF THE INVENTION

Figure 1:
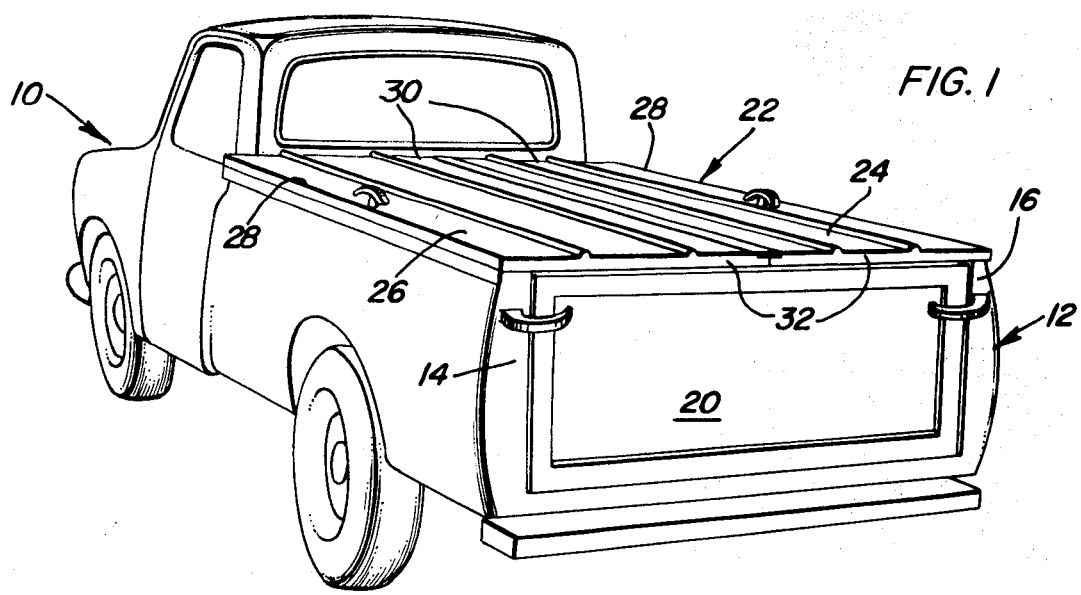
FIG. 1 is a conventional form of pickup truck equipped with the cover of the instant invention and with the cover in a closed position.

Referring now more specifically to the drawings, the numeral 10 generally designates a conventional form of pickup truck including a load bed referred to in general by the reference numeral 12 having opposite side walls 14 and 16, a front wall 18 and a conventional tailgate 20. The cover assembly of the instant invention is referred to in general by the reference numeral 22 and includes a pair of elongated side-by-side opposite side cover sections 24 and 26. The cover sections 24 and 26 include remote marginal edges 28 overlying the upper marginal edges of the side walls 14 and 16, adjacent longitudinal edges extending between the front wall 18 and the tailgate 20 along the longitudinal center line of the load bed 12 and corresponding front and rear marginal edges 30 and 32 overlying the front wall 18 and the tailgate 20.

Figure 2:
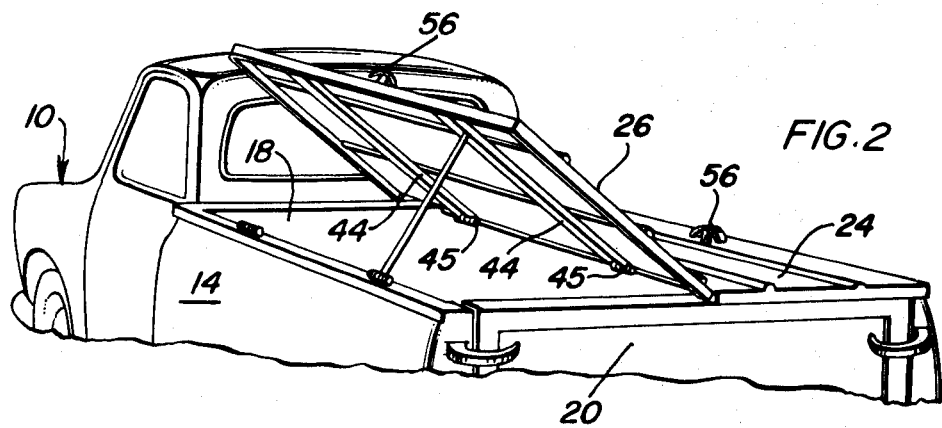
FIG. 2 is a fragmentary perspective view similar to FIG. 1 but with the left hand side of the cover in an open position.
Figure 3:
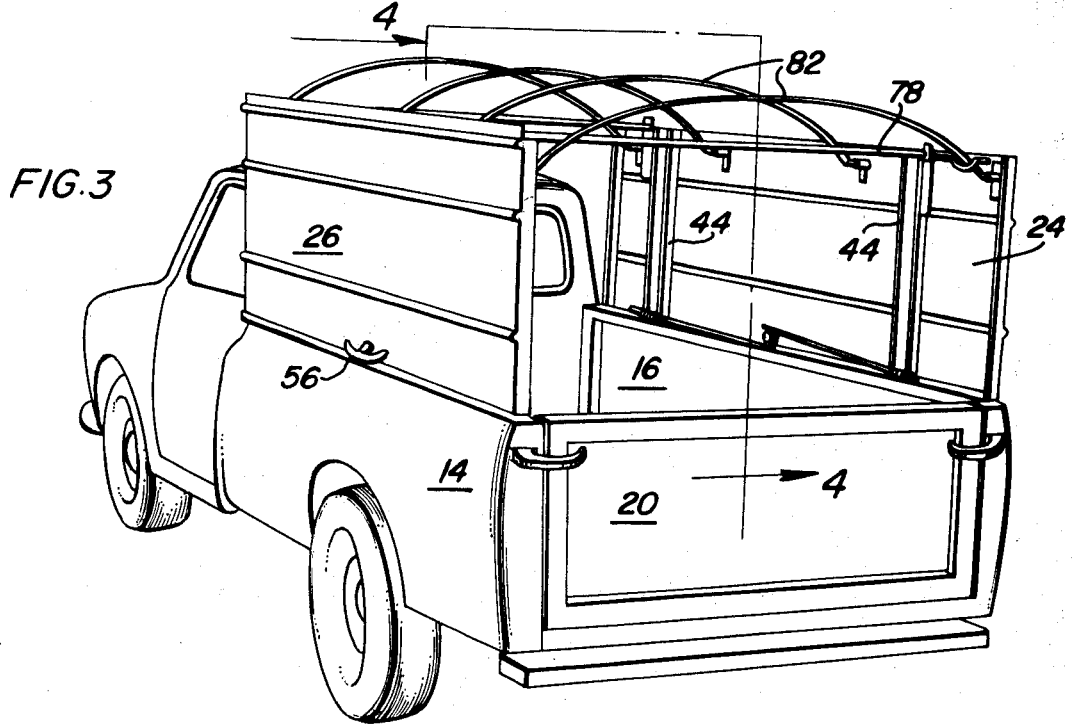
FIG. 3 is a further perspective view similar to FIG. 1 but with the cover component arranged to extend the effective height of the side walls of the pickup truck load bed.

With attention now invited more specifically to FIGS. 2, 3 and 8 of the drawings, it will be seen that each upper marginal edge portion of the side walls 14 and 16 includes a pair of longitudinally spaced hinge sections 36 secured thereto in any convenient manner such as by welding 38. Each of the hinge sections 36 includes a plurality of longitudinally spaced and aligned axially short hinge barrels 40. Each hinge barrel 40 includes a radial slot 42 extending the full length thereof, corresponding slots 42 being aligned and opening upwardly. Each cover section 24 and 26 includes a pair of longitudinally spaced tranversely extending reinforcing channels 44 secured to the underside thereof and each channel includes a hinge leaf 46 secured in the end thereof adjacent the corresponding load bed side wall. Each hinge leaf 46 includes a plurality of aligned cylindrical hinge barrels 48 which may be interdigitated with the corresponding hinge barrels 40 and aligned therewith. Each hinge leaf 46 has a hinge pin 50 operatively associated therewith and longitudinally slidably received through the corresponding hinge barrels 48 and each hinge pin 50 includes longitudinally spaced transversely narrowed portions 52 which may be moved into and out of registry with the corresponding slotted hinge barrels 40 upon longitudinal shifting of the hinge pins 50 relative to the corresponding leaves 46. The longitudinal central portions of the remote marginal edges 28 of the cover sections 24 and 26 have oscillatable latch handles 56 rotatably secured therethrough and the adjacent ends of each pair of hinge pins extend toward and are pivotally attached to the inner plate portion 58 of the corresponding latch handle 56 as at 60. Accordingly, oscillation of the corresponding latch handle 56 from the remote marginal portions 28 of the cover sections 24 and 26 may effect inverse reciprocation of the corresponding hinge pins 50 to move the transversely narrowed portions 52 thereof into and out of registry with the slotted hinge barrels 40.

The inner ends of the channel members 44 carried by the left hand cover section 26 include hinge sections 45 corresponding to the sections 36 and the inner ends of the channel members 44 carried by the cover section 24 have additional hinge leaves 66 secured therein corresponding to the hinge leaves 46, but the hinge pin portions 68 corresponding to the hinge pins 50 comprise opposite end portions of a single rod 70 and the rear end of the rod 70 is provided with a loop handle 72 which may be readily engaged from the rear of the load bed 12 when the tailgate 20 is lowered. Accordingly, the rod 70 may be longitudinally shifted to simultaneously release the hinge leaves 66 from the hinge sections 45, thereby enabling the cover sections 24 and 26 to be individually swung toward the open positions thereof illustrated in FIG. 3 of the drawings.

The adjacent ends of the channel members 44 have tubular sockets 74 supported therefrom and the depending opposite end portions 76 of a pair of cross braces 78 may be removably telescoped downwardly into the sleeves 74 when the cover sections 24 and 26 are in the full open positions thereof illustrated in FIG. 3. Also, the adjacent marginal edges of the cover sections 24 and 26 include socket members 80 supported therefrom at points spaced longitudinally therealong and the opposite ends of a plurality of transversely extending bows 82 may be removably received within the sockets 80 in order that the bows 82 may be supported in position such as that illustrated in FIG. 3 of the drawings for support of a flexible cover (not shown) over the load bed 12 when the cover sections 24 and 26 are in their open positions.

Also, with attention now invited more specifically to FIGS. 4 and 13 of the drawings, each of the cover sections 24 and 26 includes a sleeve 84 secured to its rear marginal edge portion remote from the corresponding load bed side wall and a locking pin 86 is removably received through the sleeves 84 when the cover sections 24 are in their closed positions and it is desirable to open the tailgate 20. Of course, the pin 86 prevents the adjacent corners of the rear marginal edges of the cover sections 24 and 26 from sagging downwardly when the tailgate 20 is in the open position.

In operation, assuming that the cover sections 24 and 26 are in the closed position thereof illustrated in FIG. 1 of the drawings, if it is desired to swing both of the cover sections 24 and 26 toward their open position illustrated in FIG. 3 of the drawings, the tailgate 20 is opened and the pin 86 is removed. Thereafter, the handle 72 is utilized to longitudinally shift the rod 70 in a direction to simultaneously register the transversely narrowed portions of the hinge pin sections 68 with the slots corresponding to the slots 42 in the hinge sections 45. In this manner, the hinge sections 45 will be uncoupled from the hinge leaves 68 and the cover sections 24 and 26 may be swung to the open positions thereof. Of course, the braces 78 and bows 82 may then be placed in position, if desired.

On the other hand, if it is desired to open either side of the cover assembly 22 when the cover assembly 22 is in the closed position, the corresponding handle 56 may be grasped and rotated so as to axially shift the corresponding hinge pins sufficiently to register the transversely narrowed hinge pin portions 52 with the slots 42. Thereafter, the handle 56 may be pulled upwardly in order to open the corresponding cover section toward the open position thereof illustrated in FIG. 2 of the drawings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a load receptacle of the type including first and second upstanding opposite side walls and at least one end wall extending between one pair of corresponding ends of said side walls, a cover assembly including a pair of opposite side cover sections disposed in side-by-side relation and having remote marginal edges thereof overlying the upper marginal portions of said side walls, corresponding end marginal edges overlying the upper marginal portions of said end wall and adjacent marginal edges extending longitudinally of and generally transversely centered over said receptacle, first and second separable hinge means pivotally securing said remote marginal edges to said marginal portions of said first and second side walls, respectively, third separable hinge means pivotally securing said adjacent marginal edges together, said first, second and third hinge means each including a plurality of barrel hinge structures spaced along the corresponding cover section edges and with each hinge structure including first and second relatively angularly displaceable hinge barrels and an axially shiftable hinge pin extending through said hinge barrels, one of said first and second hinge barrels being radially slotted and said hinge pins including transversely narrowed portions shiftable into and out of registry with said slotted barrels upon longitudinal shifting of said pins, and said transversely narrowed portions being receivable through said slots.

2. The combination of claim 1 including means operatively connecting said hinge pins of said plurality of barrel hinge structures together for simulataneous axial shifting relative to the corresponding hinge barrels.

3. The combination of claim 1 wherein each of said adjacent marginal edges includes longitudinally spaced transverse sleeves, a pair of elongated braces having depending opposite end portions, each of said braces being arrangeable extending transversely between said cover sections when the adjacent marginal edges thereof are swung upwardly toward open positions and with the depending end portions of said braces telescoped downwardly into respective sleeves carried by said cover sections.

4. The combination of claim 3 wherein each of said adjacent marginal edges includes longitudinally spaced sockets, and a plurality of elongated flexible cover supporting bows arrangeable between said open cover sections with the opposite ends of said bows supported in corresponding sockets on said sections.

5. The combination of claim 1 wherein said hinge pins of said third hinge means comprise opposite end portions of a single rod extending longitudinally of said cover.

6. The combination of claim 5 wherein the end of said rod remote from said one end wall includes a handle thereon for manually effecting longitudinal shifting of said rod.

7. The combination of claim 1 wherein each of said cover sections includes an oscillatable actuator adjacent the longitudinal midpoint of the edge thereof corresponding to one of said remote edges, the hinge pins of the corresponding first and second hinge means being operatively connected to the corresponding actuator for longitudinal shifting of said pins in response to oscillation of said actuator.

8. The combination of claim 1 wherein said receptacle comprises the load bed of a pickup truck.

9. In combination with the load bed of a pickup truck of the type including first and second upstanding side walls and a front end wall extending between the forward ends of said side walls, a cover assembly for said load bed including a pair of elongated opposite side cover sections disposed in side-by-side relation and having remote marginal edges thereof overlying the upper marginal portions of said side walls and adjacent marginal edges generally transversely centered over said load bed and extending longitudinally thereof, longitudinally spaced first and second separable hinge constructions pivotally securing the remote marginal edges of said cover sections to said first and second side walls, repectively, and third longitudinally spaced separable hinge constructions pivotally securing the adjacent marginal edges of said cover sections together, said first, second and third hinge constructions including acuators therefor manually operable from positions outwardly of said first and second side walls and the rear end of said load bed, respectively, for selectively separating the corresponding hinge structures, whereby said cover sections may be selectively independently swung upwardly toward open positions relative to said third hinge constructions from corresponding sides of said load bed and separably or simultaneously swung upwardly relative to said first and second hinge constructions from the rear of said load bed, said third hinge constructions each including aligned hinge barrels supported from said side cover sections and an axial shiftable hinge pin portion, the hinge barrels of said third hinge constructions on one of said cover sections being radially slotted, said hinge pin portions each including transversely narrowed portions shiftable into and out of registry with said slotted barrels upon longitudinal shifting of said pin portions, said transversely narrowed portions being receivable through said slots.

10. The combination of claim 9 wherein said hinge pin portions are interconnected for simultaneous longitudinal shifting.

* * * * *